United States Patent

Nakamura et al.

Patent Number: 5,482,368
Date of Patent: Jan. 9, 1996

[54] CONTINUOUS MIXER OPERABLE TO CONTROL SACCHARIDES CONCENTRATION

[75] Inventors: Yoshitaka Nakamura; Tadashi Inoue, both of Hirakata, Japan

[73] Assignee: Nakakin Co., Ltd., Osaka, Japan

[21] Appl. No.: 419,172

[22] Filed: Apr. 10, 1995

[51] Int. Cl.$^6$ .................................................. B01F 15/04
[52] U.S. Cl. ..................... 366/152.2; 366/160.3; 366/160.5
[58] Field of Search ........................... 366/132, 134, 366/142, 151.1, 152.1, 152.2, 152.3, 152.4, 152.5, 160.1, 160.2, 160.3, 160.5, 162.1, 16, 17; 364/502; 137/98, 100

[56] References Cited

U.S. PATENT DOCUMENTS

| | | | |
|---|---|---|---|
| 4,209,258 | 6/1980 | Oakes | 366/152.2 |
| 4,784,495 | 11/1988 | Jonsson | 366/151.1 |
| 5,308,160 | 5/1994 | Weiss | 366/160.2 |
| 5,340,210 | 8/1994 | Patel | 366/152.2 |

Primary Examiner—Robert W. Jenkins
Attorney, Agent, or Firm—Schweitzer Cornman & Gross

[57] ABSTRACT

A continuous mixer system for controlling the saccharide concentration of a sweetened liquid product mixture, which has (i) an undiluted sweetened solution input, (ii) a water input, (iii) a mixer having a product output, (iv) a first positive displacement rotary pump having a speed of rotation for feeding an undiluted sweetened solution through the undiluted sweetened solution input, (v) a second positive displacement rotary pump having a speed of rotation for feeding water through the water input, (vi) a continuous saccharometer for detecting the saccharide concentration of the product mixture discharged through the product output, (vii) a first speed adjuster for adjusting the rotational speed of said first rotary pump, (viii) a second speed adjuster for adjusting the rotational speed of the second rotary pump; and (ix) a controller, wherein a target value $SB_x$ of the saccharide concentration at the product output is preset in the controller and an actual value $XB_x$ detected by the saccharometer at the product output is compared in the controller with the target value $SB_x$, the first and second speed adjusters can change the speeds of rotation of the first and the second pumps to reduce any difference found between $SB_x$ and $XG_x$.

6 Claims, 4 Drawing Sheets

CONTINUOUS MIXER OPERABLE TO CONTROL SACCHARIDES CONCENTRATION

FIELD OF THE INVENTION

The present invention relates to a continuous mixer for controlling the concentration of saccharides contained in sweetened beverages such as prepared fruit juice drinks and sports drinks wherein a concentrate containing a saccharide is diluted with water.

BACKGROUND OF THE INVENTION

Fruit juices, other than fresh squeezed ones, sports drinks and the like are generally prepared by reconstituting or diluting with water a concentrated solution of a flavored sweetener. The quantity of the added sweetener such as cane sugar or the like additive depends on its concentration, wherein a Brix scale value as determined by a saccharometer corresponds to the specific gravity of a saccharide solution. The concentration of saccharides in the prepared sweetened beverage after dilution or reconstitution is comparatively low, suitably for example 5–12 Brix degrees. In the prior art the specific gravity corresponding to the saccharide concentration of an undiluted solution has been relied on for preparation and quality control with another specific gravity corresponding to a target saccharide concentration in the product. A blend ratio by volume is generally calculated in charging a mixing tank with a calculated volume of undiluted solution and water. If an unacceptable error is detected between the actual and target concentrations an appropriate amount of undiluted solution or water is added to the product to adjust its saccharide concentration.

Such a batchwise manner of adjusting the final sweetener concentration, however, is not an efficient way for preparing the product with a target saccharide concentration. This is because the workers have to rely on their senses and their perception when an additional amount of undiluted solution or water has to be added. In a case when an undiluted solution is continuously blended with water for production of a sweet beverage with a target saccharide concentration, the sweetener concentration in the undiluted solution is suitably adjusted at an early stage with a very high precision. The preparation of the undiluted solution requires a great deal of labor and a long time, both impairing productivity.

SUMMARY OF THE INVENTION

An object of the present invention is to provide a continuous device for producing a sweetened liquid mixture with controlled saccharide concentration. The device comprises a controller, a mixer, a concentration detector, positive-displacement pumps for feeding an undiluted solution and water, and adjusting means for controlling the pumps. A target saccharide concentration is preset in the controller of the mixer, the detector continuously detects the actual saccharide concentration in the liquid mixture as it is discharged from the mixer. The controller regulates the adjusting means to change the speed of the pumps for fast adjustment of the flow rates of the undiluted sweetener solution and of water so that any difference between the target and actual concentrations is gradually reduced for a more efficient production of the liquid mixture which can thus be also produced more easily and more accurately than in the prior art by batchwise control.

Another object of the present invention is to provide a further function to a continuous mixer that operates so that a volume ratio is calculated of the undiluted solution to the liquid mixture by using the saccharide concentration of the solution together with the target value for the mixture. A delivery rate of the product and the volume ratio are utilized to calculate feed rates of the undiluted solution and the water both of which are supplied to the mixer. The feed rates that are thus calculated are useful to regulate the adjusting means to determine the speeds of the pumps and to provide the initial feed rates. Therefore, the product will have a saccharide concentration that will not deviate too greatly from the target value, even during the initial operation of the mixer device of the present invention.

The mixer can be suitably provided with yet another function that regulates the preset saccharide concentration of the undiluted solution as if it were higher or lower than desired and thus requiring an appropriate correction. Thus a predetermined time can be set to be slightly longer than a time period within which the detecting means such as a continuous saccharometer or saccharimeter (collectively referred to herein as "saccharometer") will become able to accurately detect the saccharide concentration in the liquid mixture. This kind of timing of the mixer is advantageous in that an undesirable saccharide concentration fluctuations of the product is reduced or avoided even during the initial stage of operation, in contrast as it tends to happen when upon the starting of the mixer the speed of the pump is immediately controlled on the basis of the difference between the detected and target values. Thus, the saccharide concentration in the product is free from any intolerable variations, even before the continuous saccharometer becomes stable and reliable in its function.

Further, tachometers or the like may be suitably employed to detect the r.p.m. of the pumps and to produce the detected data for comparison with values provided by the controller. This permits the adjusting means to control the pump rotation based on a difference between the detected data and the provided data. This feature is advantageous in that it enables the use of pure water.

A still further object of the present invention is to provide an inline mixer with a deaerating/stabilizing tank connected to its downstream end. The inline mixer is suitably provided with a cylindrical body in which the undiluted solution and the pumped water are mixed. This structure reduces any undesirable fluctuations in saccharide concentration detected by the saccharometer for the liquid mixture, thus providing a further improved accuracy of control of the saccharide concentration.

The deaerating/stabilizing tank is suitably closed so that the mixture of undiluted solution and water are delivered by positive displacement pumps from the mixer line enters the tank where any gases generated in the mixing line are removed. The liquid mixture is deaerated and is stabilized within the tank. The water and concentrate delivery pumps are substantially free from any noticeable variation in their delivery rates, so that no undesirable concentration fluctuation of the mixture occurs when measured by the saccharometer, thus affording a more accurate measurement and control of the saccharide concentration.

DESCRIPTION OF THE DRAWING

The invention is described below in greater detail, with reference being had to the drawing, wherein.

DETAILED DESCRIPTION

Figure 1:
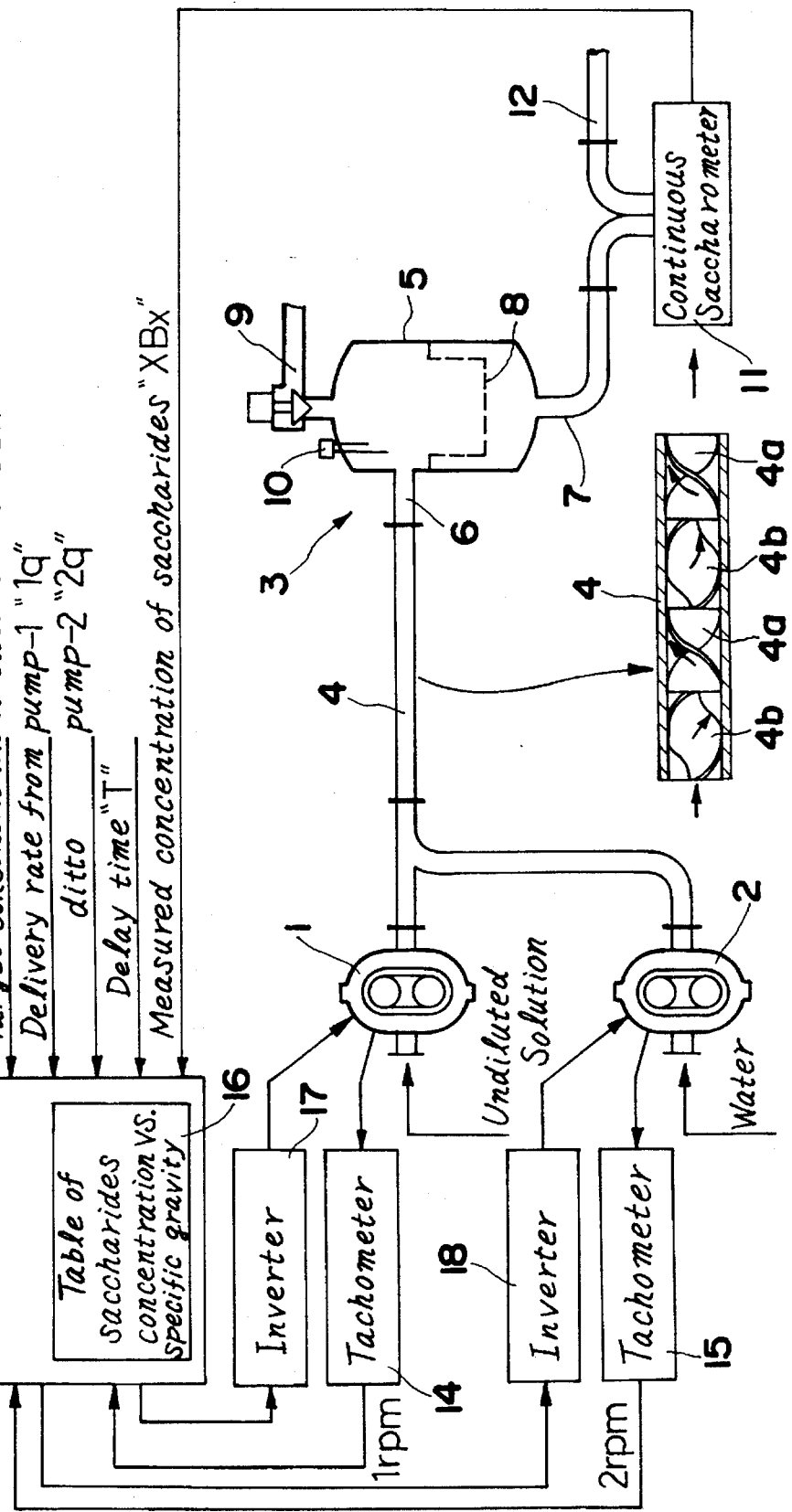
FIG. 1 is a block diagram illustrating one embodiment of a continuous mixer for preparing a mixture of water and an undiluted solution.

A first positive displacement pump 1 feeds an undiluted solution and a second positive displacement pump 2 feeds water into the mixer shown in FIG. 1. The positive displacement pumps 1 and 2 are rotary pumps intended to provide a smaller fluctuation in the delivered rate than is produced by conventional reciprocating pumps. A mixer 3 comprises a cylindrical mixing line 4 in which the undiluted solution from the pump 1 and the water from the other pump 2 become mixed, and a deaeration/stabilization tank 5 connected to an outlet of the mixing line 4.

The mixing line 4 contains a plurality of twisted elements 4a and 4b arranged axially and alternatingly within the cylindrical body. The elements 4a are twisted for example clockwise, and the other elements 4b can be twisted counter clockwise, or vice versa, when they are viewed from the inlet side of the mixing line. The ends of adjacent twisted elements 4a and 4b are in close contact with each other, but with a 90° angular shift as shown in the enlarged broken outpost in FIG. 1. The aleaeration/stabilization tank 5 has an approximate middle height a tangential entry inlet 6 into the tank and an outlet 7 from the bottom of the tank. A perforated divider or net 8 secured in the tank and below the inlet 6 divides the interior of the tank into upper and lower compartments. A deaerator or outlet 9 having a closable valve and a level shift 10 extend from the top of the tank. The tank 5 not only eliminates any gases which may be entrapped in the arriving liquid, but also stabilizes the mixed aqueous solution.

A continuous saccharometer 11 is disposed between the outlet and a product delivery pipe 12. A controller 13 is connected from the saccharometer 11, and suitably includes a sequence computer that receives an actual saccharide concentration signal $XB_x$; a preset target value signal $SB_x$; an undiluted solution saccharide concentration signal $GB_x$; delivery rate signals '1q' and '2q' per rotation of the respective first and second pumps 1 and 2, and their speeds of rotation '1 rpm' and '2 rpm' detected by tachometers 14 and 15; a table 16 of predetermined values providing the relationship between saccharide concentrations and specific gravities corresponding thereto; and a delay time "T". The controller 13 executes a control program based on the aforementioned input signals for controlling speed adjusters such as inverters 17 and 18 for the pumps 1 and 2.

Figure 2:
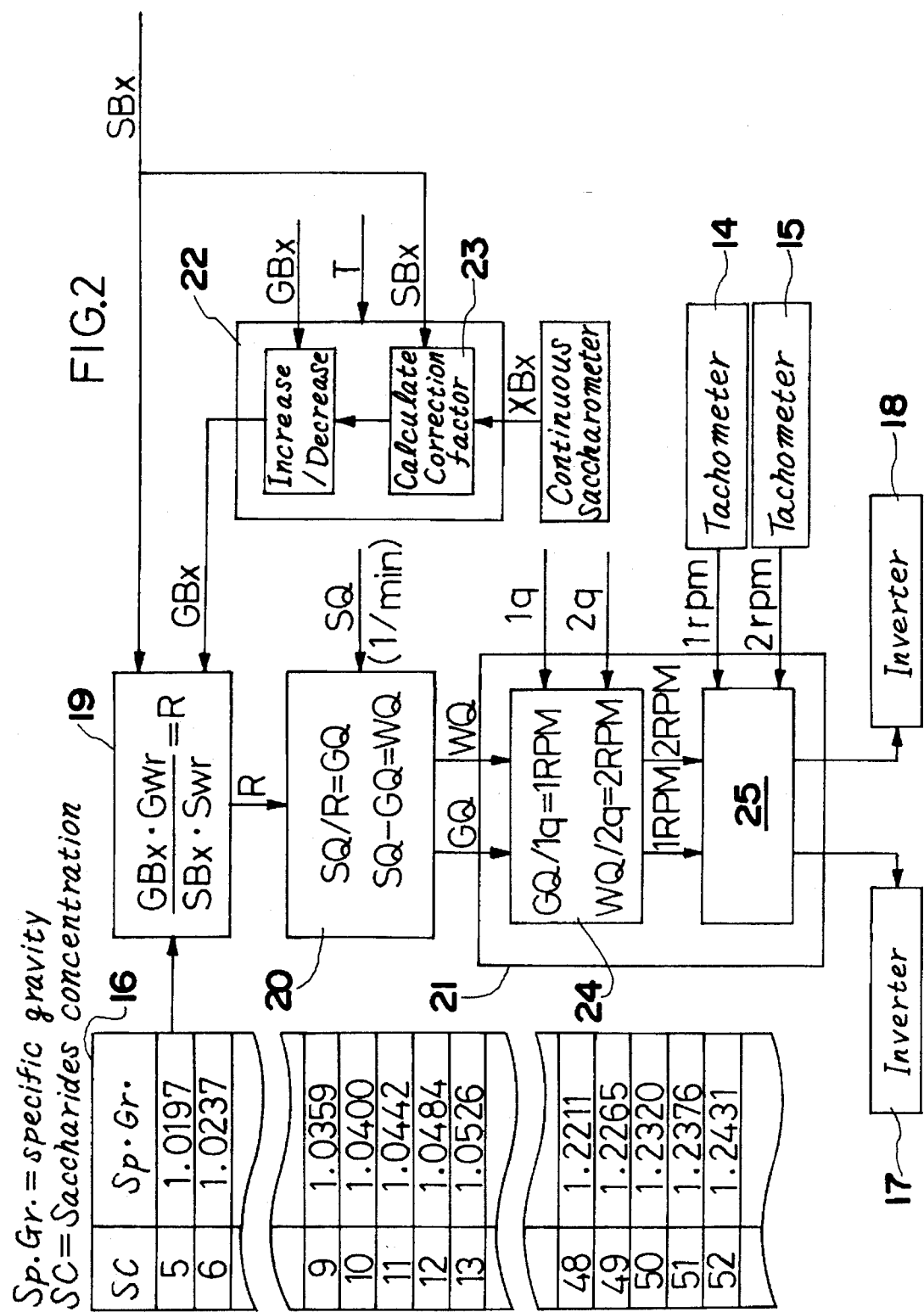
FIG. 2 is a schematic illustration of a controller in the continuous mixer of FIG. 1.

More specifically, the controller 13 calculates the difference between the signals $XB_x$ and $SB_x$ and controls the speed adjusters 17 and 18 to reduce the difference between the rotational speeds of the pumps 1 and 2. The controller 13 performs four functions 19–22 shown in FIG. 2. The first function 19 determines from the table 16 the specific gravities $GW_r$ and $SW_r$ from the actual saccharide concentration $XB_x$, and the preset target saccharides concentration $SB_x$, to obtain the volume ratio 'R' of the undiluted solution to the liquid mixture. In the second function 20 of the controller 13 the volume ratio 'R' and the target delivery rate 'SQ' of the product mixture are used to determine a feed rate 'GQ'= 'SQ/'R' of the undiluted feed concentrate and a feed rate 'WQ'='SQ'–'GQ' of the feed water, both flowing into the mixer 3. The third function 21 of the controller 13 controls the speed adjuster 17 and 18 of the pumps 1 and 2, so that the feed rates 'GQ' and 'WQ' remain effective during an initial period after the starting of the system.

The fourth function 22 increases or decreases the preset saccharide concentration $GB_x$ as described in the following. The actual saccharide concentration signal $XB_x$ determined by the continuous saccharometer 11 is compared with the target value $SB_x$ to obtain a difference between these values to determine which of them is greater. The fourth function 22 of the controller also includes a subfunction 23 so that the difference $XB_x - SB_x$ or a certain preselected value '1' is employed as a positive correction factor when $XB_x > SB_x$, and the difference $SB_x - XB_x$ or the preselected value '1' is employed as a negative correction factor when $XB_x < SB_x$. These positive or negative correction factors are added to the preset saccharide concentration $GB_x$ of the undiluted solution, which is thus increased or decreased. Such the fourth function 22 is programmed to become functional after an initial delay period 'T'. The delay time can be alternatively provided by causing the saccharometer 11 to delay the detection of the saccharide concentration in the product after the delay time 'T' and by deactivating the function 22 if the detected value $XB_x$ is zero.

The third function 21 for controlling the pumps 1 and 2 through the speed adjusters 17 and 18 includes subfunction 24 and 25. The subfunction 24 calculates the rotational speeds '1 rpm and 2 rpm' of the pumps 1 and 2 from the calculated feed rates 'GQ' and 'WQ' and the delivery volumes '1q' and '2q' per each rotation of the pumps 1 and 2 to obtain these feed rates 'GQ' and 'WQ'. The other subfunction 25 is a feedback control compares the calculated rotational speeds '1 RPM' and '2 RPM', with the actual speeds '1 rpm' and '2 rpm' of the pumps 1 and 2 detected by the tachometers 14 and 15 respectively, and any differences found between the speeds 'IRPM' and '1 rpm' and between the '2 RPM' and '2 rpm' is used to control the speed adjusters 17 and 18 to diminish these differences by feedback.

Figure 3:
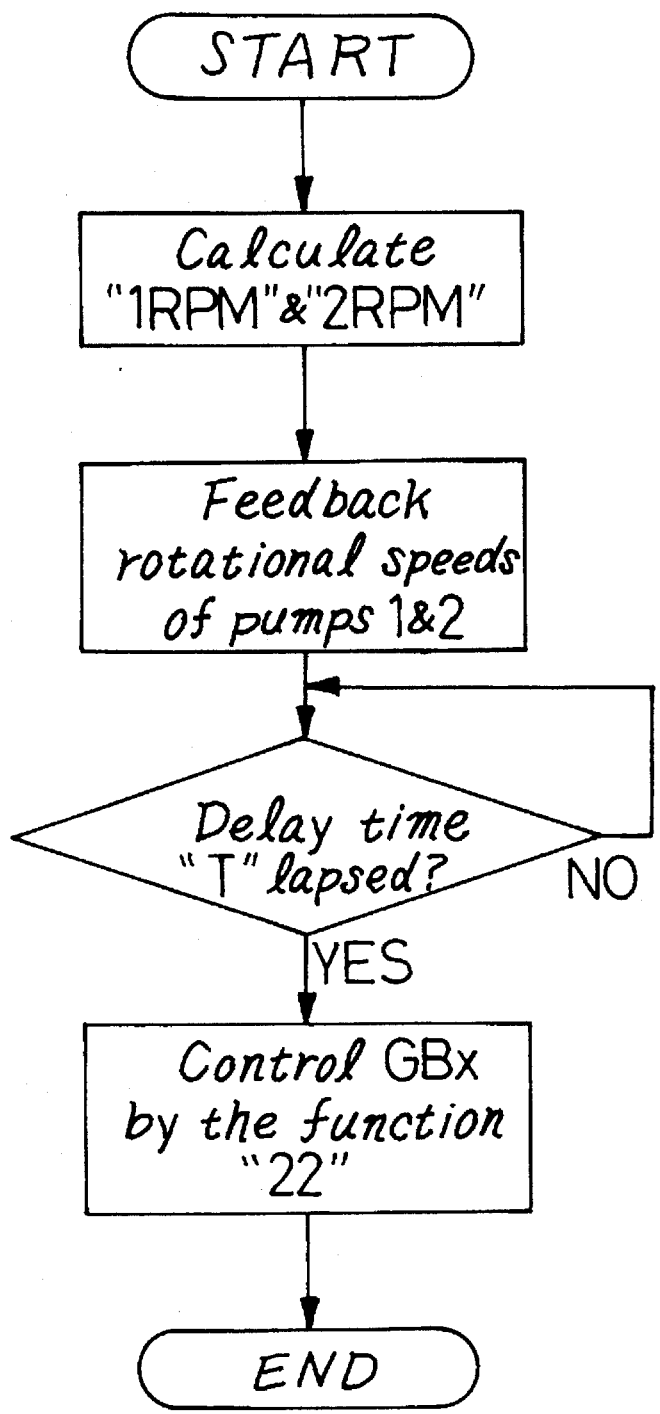
FIG. 3 is a flow chart showing the operation of the controller of FIG. 2.

A control program of the controller 13 and including the functions 19–24 is represented in the flow chart of FIG. 3. In the first step, the saccharide concentrations $GB_x$ and $SB_x$ and the product delivery rate SQ are preset in the controller 13 so that the functions 19 and 20 can calculate the feed rates GQ and WQ, In an illustrated example the saccharide concentration $GB_x$ of the undiluted solution is 50 Brix degrees, the target saccharide concentration of the product mixture is 11 Brix degrees, and the product delivery rate is 200 liters/min. In that example the following equations are calculated:

$$GB_x \cdot Gw_r / SB_x \cdot Sw_r = R$$

$$SQ/R = GQ$$

$$SQ - GQ = WQ$$

to provide a value of 5.387 for 'R', which in turn provides a value of 37 liters/rain for the feed rate of the undiluted solution, and a further value of 163 liters/min as the feed rate of the water. These feed rates are then divided by the preset delivery volumes of the pumps 1 and 2 per each rotation so that the rotational speeds '1 RPM' and '2 RPM' are determined at which these pumps should rotate. Next 1 RPM and 2 RPM are compared with the actual rotational speeds '1 rpm' and '2 rpm' signaled from the tachometers 14 and 15. If any difference is found between '1 RPM' and '1 rpm' and/or between '2 RPM' and '2 rpm', then the subfunction 25 will control the speed adjuster 17 and/or 18 by feedback so that the rotational speeds of the pumps 1 and/or 2 are changed to reduce that difference. Thus the first pump 1 will feed the undiluted solution at a rate of about 37 liters/min, and the second pump 2 will feed the water at a rate of about 163 liters/min, into the mixerline 4 where the undiluted solution is continuously blended with the water.

The resulting mixture exiting from the mixerline 4 is transferred to the closed deaeration/stabilization tank 5. The mixture whirling within this tank is repeatedly passed through the net 8 and is thus deaerated. Concurrently, any unevenness realized inhomogeneity in concentration is eliminated from the mass of the mixture which is thus stabilized, before it is fed to 'bottling apparatus (not shown) through the product delivery pipe 12. The gas separated from the mixture and accumulated in the upper part of the tank 5 is exhausted from there, as the level sensor 10 controls the valve of the deaerate outlet 9.

The saccharide concentration of the product mixture in the product delivery pipe 12 is measured continuously by the saccharometer 11 upstream of the bottling apparatus. Saccharometers of the type that in their idle state indicate no saccharides require a considerable time period to start being responsive to the saccharide concentration. Such meters cannot accurately detect the concentration of saccharides until a delay period of about 30 seconds passed after their having been turned on. A considerable time period is also necessary for the first and second pumps 1 and 2 to perform at a stable delivery rate. Therefore suitably a delay time 'T', for example of 40–60 seconds is employed and suitably the feedback control of the first and second pumps 1 and 2 based on the calculated rotational speeds '1 RPM' and '2 RPM' is not commenced after such a delay period has passed.

Figure 4:
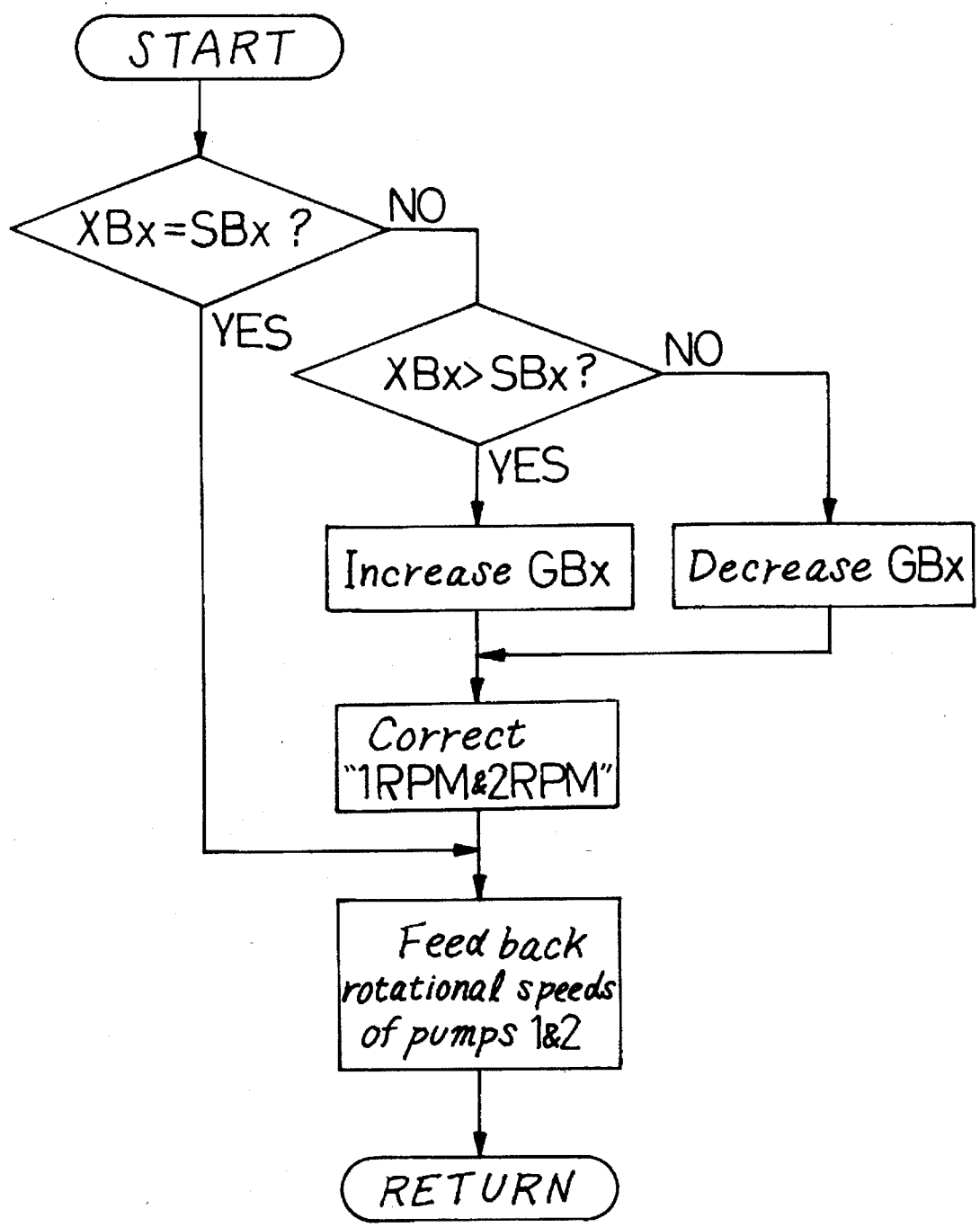
FIG. 4 is a flow chart showing the operation of another means for altering the saccharide concentration of the undiluted solution.

After the delay period 'T' is over, the fourth function 22 becomes operative so that the control of saccharide concentration in the undiluted solution is combined with the aforementioned feedback control. That combined control is represented in the flow chart shown in FIG. 4. In the first step the concentration reading $XB_x$ from the continuous saccharometer 11 is compared with the target value $SB_x$ to determine a difference between them. If there is no difference found or the difference falls within a tolerable range, then the preset concentration $GB_x$ is kept unchanged, and only the feedback control of first and second pumps 1 and 2 is carried out to run them at the rotational speeds '1 RPM' and '2 RPM' as determined from the starting conditions. If for example the detected value $XB_x$ is 12 Brix degrees which is higher than the target value $SB_x$ of 11 Brix degrees, then a positive correction factor '+1' is added to the preset saccharide concentration of 50 Brix degrees for the undiluted solution, thereby to increase it to and referred as 51 Brix degrees. If, on the other hand, the detected value $XB_x$ is 10 Brix degrees which is lower than the target value $SB_x$, then a negative correction factor '−1' will be added to the preset saccharide concentration of 50 Brix degrees of the undiluted solution, thereby to decrease it to be referred as 49 Brix degrees. The feed rates GQ and WQ of the undiluted solution and of the water will change by correcting the preset value $GB_x$ in the aforementioned manner. In the case of the example wherein the value $GB_x$ is corrected from 50 Brix degrees to 51 Brix degrees, the volume ratio 'R' becomes 5.495 which in turn will decrease GQ from 37 to 36 liters/rain, with WG being increased from 163 to 164 liters/min. In the other example in which the value $GB_x$ is corrected from 50 Brix degrees to 49 Brix degrees, the ratio by volume 'R' becomes 5.232 which in turn will increase GQ from 37 to 38 liters/min, and with WG being decreased from 163 to 162 liters/min. In short, a result $XB_x > SB_x$ corrects the GQ and WQ values respectively to increase and decrease, while result of $XB_x < SB_x$ corrects the GQ and WQ values respectively to decrease and increase.

As the saccharide concentration $GB_x$ of the undiluted solution is corrected in the aforedescribed manner, the calculated target rotation speeds '1 RPM' and '2 RPM' are corrected correspondingly. If $XB_x > SB_x$, then the rotational speed '1 RPM' of the first pump 1 is decreased, while '2 RPM' of the second pump is increased at the same time. If $XB_x < SB_x$, then the target speed '1 RPM' of the first pump is increased while the speed '2 RPM' of the second pump is decreased at the same time. After such a correction of the speeds of the pumps, the system returns to the feedback control in which the actual speeds '1 rpm' ad '2 rpm' are detected and compared with the respective corrected target values '1 RPM' and '2 RPM'. The pumps now rotating at the corrected speeds cause the actual value $XB_x$ to coincide with the target value SBx of the saccharide concentration in the product mixture.

The adjusting or correction of the preset target value $GB_x$ of the undiluted solution is repeated during the feedback modes of controlling the speeds of the pumps. Thus the saccharide concentration $XB_x$ of the product mixture that is discharged from the mixer 3 and is detected by the continuous saccharometer 11 continuously coincides with the target value $SB_x$ or falls within an allowable range including $SB_x$.

The speeds of the first and second pumps 1 and 2 are thus controlled in a direct feedback mode directly sensing and relying on the pump speeds. In the alternative, flow rate detectors can be used for an indirect feedback control of the pumps feeding the undiluted solution and the water, and also to regulate their flow rate fed to the mixer 3. In the former case, pure water can be added to the undiluted solution. It is however to be noted that in the latter case the flow rate of pure water cannot be detected by an electromagnetic flow meter, and an appropriate selection must be made of the kind of water as well as of the type of flow meter to insure an accurate measurement of the flow rate of water.

We claim:

1. A continuous mixer system for controlling the saccharide concentration of a sweetened liquid product mixture, which comprises (i) an undiluted sweetened solution input, (ii) a water input, (iii) a mixer having a product output, (iv) a first positive displacement rotary pump having a speed of rotation for feeding an undiluted sweetened solution through said undiluted sweetened solution input, (v) a second positive displacement rotary pump having a speed of rotation for feeding water through said water input, (vi) a continuous saccharometer for detecting the saccharide concentration of the product mixture discharged through said product output, (vii) a first speed adjuster for adjusting the rotational speed of said first rotary pump, (viii) a second speed adjuster for adjusting the rotational speed of said second rotary pump; and (ix) a controller, wherein a target value $SB_x$ of the saccharide concentration at the product output is preset in the controller, and an actual value $XB_x$ detected by the saccharometer at the product output is compared in the controller with said target value $SB_x$, said first and second speed adjusters being adapted to change said speeds of rotation of said first and said second pumps to reduce any difference found between $SB_x$ and $XG_x$.

2. The continuous mixer system of claim 1, wherein said controller is adapted to determine
   (A) a volume ratio 'R' of (a) the undiluted solution at the undiluted sweetened solution input to (b) the product mixture at the product output, and
   (B) (a) a preset saccharide concentration $GB_x$ for the undiluted solution at said input, (b) said target value $SB_x$, (c) a feed rate 'GQ' of said undiluted sweetened solution at its input, and (d) a feed rate 'WQ' of the water at said water input, all based on a product mixture delivery rate 'SQ' at said product output, and at said volume ratio 'R', the thus determined values 'GQ and 'WQ' being adapted to provide a signal for said first and said second speed adjusters to control the speeds of rotation of said first and said second pumps, and to provide initial feed rates at said undiluted sweetener solution input and said water input, and said controller is adapted to correct upward or downward the saccharide concentration $GB_x$ of the undiluted solution based on any difference between the actual value $XB_x$ and the target value $SB_x$ thereof.

3. The continuous mixer system of claim 2, wherein said mixer is adapted to be started after a delay time period 'T' from the start of operation of the mixer to increase or to decrease the saccharide concentration $GB_x$ of the undiluted solution based on any difference between the actual value $XB_x$ and the target value $SB_x$ of the saccharide concentration.

4. The continuous mixer system of claim 2, further comprising a first tachometer for determining a first actual speed of rotation '1 rpm' of said first pump, and a second tachometer for determining a second actual speed of rotation '2 rpm' of said second pump, said controller being adapted to operate said first pump at a first calculated speed of '1 RPM' to feed at the undiluted sweetened solution input at a calculated feed rate of 'GQ', and to operate said second pump at a second calculated speed of '2 RPM' to feed at the water input at a calculated feed rate of 'WQ', said first and said second actual speeds '1 rpm' and '2 rpm' respectively being adapted to be compared with the respective calculated speeds '1 RPM' and '2 RPM', whereby said first speed adjuster is adjusted to diminish any difference between the actual and calculated speeds of said first and second pumps.

5. The continuous mixer system of claim 1, wherein the mixer comprises a line mixer having a cylindrical body in which the undiluted sweetened solution from its input is blended with the water from the water input to provide said product mixture, the system further comprising a deaeration/stabilization tank, the product output of said mixer being adapted to discharge the product mixture into said deaeration/stabilization tank.

6. A process for preparing a sweetened liquid product mixture with the mixer system of claim 1, which comprises determining with said controller
   (A) a volume ratio 'R' of (a) the undiluted solution at the undiluted sweetened solution input to (b) the product mixture at the product output, and
   (B) (a) a preset saccharide concentration $GB_x$ for the undiluted solution at said input, (b) said target value $SB_x$, (c) a feed rate 'GQ' of said undiluted sweetened solution at its input, and (d) a feed rate 'WQ' of the water at said water input, all based on a product mixture delivery rate 'SQ' at said product output, and at said volume ratio 'R', deriving from the thus determined values 'GQ and 'WQ' a signal for said first and said second speed adjusters to control the speeds of rotation of said first and said second pumps, and to provide initial feed rates at said undiluted sweetener solution input and said water input, and correcting with said controller upward or downward the saccharide concentration $GB_x$ of the undiluted solution based on any difference between the actual value $XB_x$ and the target value $SB_x$ thereof.

\* \* \* \* \*